United States Patent [19]

Krall

[11] 3,921,285

[45] Nov. 25, 1975

[54] METHOD FOR JOINING MICROMINIATURE COMPONENTS TO A CARRYING STRUCTURE

[75] Inventor: Bogdan Krall, Wappingers Falls, N.Y.

[73] Assignee: International Business Machines Corporation, Armonk, N.Y.

[22] Filed: July 15, 1974

[21] Appl. No.: 488,592

[52] U.S. Cl. ...................... 29/626; 29/577; 29/589; 174/68.5; 317/101 CC; 357/74

[51] Int. Cl.[2] ........................................ H05K 3/34

[58] Field of Search ............. 29/577, 582, 589–591, 29/626, 471.3, 471.9, 472.1, 472.5, 487, 500, 501; 317/101 C, 101 CC; 357/74, 80, 66; 174/68.5

[56] References Cited

UNITED STATES PATENTS

| | | | |
|---|---|---|---|
| 3,373,481 | 3/1968 | Lins et al. | 29/589 X |
| 3,680,198 | 8/1972 | Wood | 29/589 X |
| 3,811,186 | 5/1974 | Larnerd et al. | 29/577 X |

*Primary Examiner*—C. W. Lanham
*Assistant Examiner*—Joseph A. Walkowski
*Attorney, Agent, or Firm*—George O. Saile

[57] ABSTRACT

A method for joining microminiature components to a carrying structure wherein the height of the electrical connecting structures are adjusted during the joining process. The height of the electrical connecting structures may either be adjusted during the original joining of the component to the carrying structure or it may be done in a two step solder reflow process. In the two step process the component is first joined to the carrying structure and then an additional height is given to the electrical connecting structures which improves the lifetime of the joining terminals. In each of the alternatives, a bridge together with a vaporizable fluid which wets both the bridge and a surface of the component opposite to the surface which carries the connecting structure. At the temperature of melting of the material used in the connecting structure, the fluid evaporates and surface tension pulls the component closer to the bridge which in turn elongates or increases the height of the electrical connecting structures between the carrying structure and the component.

15 Claims, 7 Drawing Figures

METHOD FOR JOINING MICROMINIATURE COMPONENTS TO A CARRYING STRUCTURE

BACKGROUND OF THE INVENTION

The invention relates to methods of joining a microminiature component to a carrying structure and the adjustment to the electrical connecting structures which physically and electrically join the component and the carrying structure.

DESCRIPTION OF THE PRIOR ART

There are many techniques for joining components, which include semiconductor discrete diodes and transistors, integrated circuits, resistors, capacitors, etc. to a carrier which allows the input and output to the component.

The two general categories of semiconductor chip joining involve whether the contacts of the chip are faced down toward the carrying substrate or are faced up away from the carrying substrate. The first technique involving contacts down is known in the art as face down bonding or flip chip bonding. The second is generally called in the art backside bonding.

The present invention involves the face down or flip chip bonding. There are various methods for joining the semiconductor chip to the carrier in the flip chip configuration. Some of these include various solder reflow techniques, ultrasonic and thermal-compression bonding.

The present invention is an improvement in the solder reflow controlled collapse technology. The U.S. Pat. Nos. 3,401,126 and 3,429,040 to Lewis F. Miller and assigned to the assignee of the present patent application describes in detail the controlled collapse technique of face down bonding of semiconductor chips to a carrier. In general, what is described and claimed in those patents is the formation of a malleable pad of metallic solder on the semiconductor chip contact sites and solder joinable sites on the conductors on the chip carrier. The chip carrier solder joinable sites are surrounded by non-solderable barriers so that when the solder on the carrier sites and semiconductor device contact sites melt and merge, surface tension holds the semiconductor chip suspended above the carrier.

It has been found that the life of the semiconductor chip and carrier structure or module can be increased by the ability of at least some of the connector joints between the component and the carrier to withstand increased shear stress. The patent application entitled "Flip Chip Module With Non-Uniform Solder Wettable Areas on Substrate" to William J. King and David L. Wilcox, U.S. Pat. No. 3,871,014, and patent application "Flip-Chip Module With Non-Uniform Connector Joints" to P. C. Lin and E. M. Winter, U.S. Pat. No. 3,871,015, both assigned to the same assignee as the present patent application describe structures and methods for the design of interconnection joints between semiconductor chips and carriers so that not all of the joints are identical. The differences in geometry of the connectors result in the connectors having different abilities to withstand thermal stress. Those having a lesser ability to withstand stress are positioned at points at relatively low stress or serve as non-electrically active dummy points. These patent applications taught that the difference in shape of the connector or joint is brought about by, for example, difference in size of the solder wettable areas on the substrate or difference in the amount of solder placed on a given substrate chip joining land site area.

SUMMARY OF THE PRESENT INVENTION

In accordance with the present invention, the life of a semiconductor chip-carrier is increased by increasing the ability of all connector joints to withstand shear stress. The method involves the elongation of the solder joints between the component and its carrier. Either during the initial joining or in a subsequent elongation step. This is accomplished by placing an amount of a vaporizable material upon the surface of the component which is opposite to the surface having the solder terminals. A bridge is placed over the component so that there is a cavity between the surface of the component having the vaporizable material thereon and the bottom of the bridge. The material is either liquid at room temperature time or becomes liquid at least before the solder melts at which time the liquid wets the bridge and the surface. The structure is then heated until the solder terminals become liquid. Heating continues until a desired portion of the vaporizable material is evaporated. The action of vaporization and surface tension pulls the component closer to the bridge which in turn elongates the solder joint. Upon cooling the joint remains fixed in its elongated shape, the bridge is removed and the remaining vaporizable material is then easily cleaned away.

DESCRIPTION OF THE PREFERRED EMBODIMENTS

Figure 1:
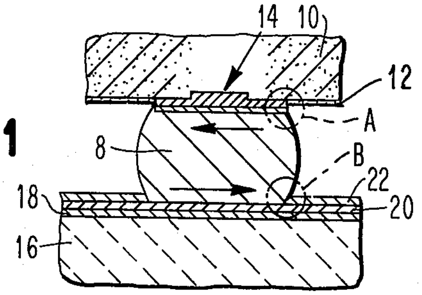
FIG. 1 represents a greatly enlarged solder joint between a carrier and a semiconductor chip which is the shape form using the normal controlled collapse process.

FIG. 1 shows the present geometry of the solder joint 8 which is produced by the controlled collapse method described in great detail in U.S. Pat. Nos. 3,401,126 and 3,429,040 referred to above. For illustration purposes, a semiconductor chip is shown joined to a ceramic substrate. Obviously, other components such as resistors, capacitors, diodes, etc. could also be similarly joined. The silicon chip 10 contains active and passive devices within its body formed according to conventional semiconductor planar processing techniques. These devices are not shown since they do not form a part of the present invention. The upper surface of the semiconductor chip has a coating 12 formed of a glass passivating material such as silicon dioxide, silicon nitride, alumina, phosphorous pentoxide, or similar materials or combinations of such materials. The semiconductor chip may have many active and passive devices within its body and multi-layers of metallurgy and insulators thereover to connect the devices into circuits. The terminal metallurgy contacts which are made to the outside of the semiconductor chip are shown in FIG. 1 schematically as region 14. The metallurgy of this region 14 may be of many possible compositions. However, one particularly desirable composition is a series of metals which are chromium, copper and gold. This series of metals can be put down by means of vacuum evaporation. The terminal metallurgy structure and process for making the same is described in greater detail in the J. Langdon et al U.S. Pat. Nos. 3,429,029 and 3,506,880 assigned to the same assignee of the present patent application.

The carrier may be of many different types and materials such as glass, various types of ceramic such as alumina, and various types of plastic material. The one preferred example of a carrier is illustrated in FIG. 1 which is an alumina substrate 16 having layers of chromium 18, copper 20, and chromium 22 which may be vacuum evaporated onto the surface of the alumina. The upper layer of chromium is etched away at the sites for chip joining. The substrate is then dipped into a solder bath. The areas of exposed copper will be wetted and coated with solder from the bath and the areas of chromium would not be wetted by the solder and therefore remain clean. Various solders are operative in this technology. Two particular useful solders are tin-lead or lead-indium solder.

The same solder that is used to wet the copper areas is deposited on the terminal metallurgy contacts 14 by various techniques. One preferred method is by the vacuum evaporation method which is described in J. L. Langdon et al U.S. Pat. No. 3,401,055, and assigned to the same assignee as is the present patent application. The deposited solder is then heated to then form a ball of solder over the terminal metallurgy sites on the surface of the semiconductor chip. The chip is then placed on the substrate with the solder balls on the substrate sites of exposed copper which has been coated with the solder.

The chip is joined by passing the composite into a furnace where the solder contacts and the connecting areas are heated to a temperature and for a time sufficient to melt the solder. The solder ball on the chip and the solder from the connecting area form a unified solder mass at this temperature. The solder maintains itself in substantially a ball on the copper area because of the surface tension phenomena caused by the fact that the solder does not wet the chromium regions 22 or the glass regions 12. The component is thereby supported by the molten solder ball and space from the substrate 16. The temperature is reduced to room temperature and the solder thereby solidified. The FIG. 1 structure is the resulting structure from such a process wherein the prior art method of J. L. Langdon et al U.S. Pat. No. 3,429,040 and U.S. Pat. No. 3,401,126 is used.

The spherical shape at the sharp corners in areas A and B as shown in FIG. 1 are highly stressed during heating up and cooling down of the solder connection which may be termed a thermal cycling. The arrows inside the solder joint indicate the shear stress that is due to the mismatch of the thermal coefficient of expansion between the substrate which may be alumina and the semiconductor and the component which may be a silicon semiconductor chip. Where silicon and alumina are used for the component and carrying substrate respectfully, the mismatch is approximately $3.5 \times 10^{-6}$ inches per inch degrees C. The thermal coefficient of expansion for silicon is $2.5 \times 10^{-6}$ inches per inch degrees C and alumina is $6 \times 10^{-6}$ inches per inch degrees C. This limits the life of the module because of the FIG. 1 joint structure.

Figure 2:
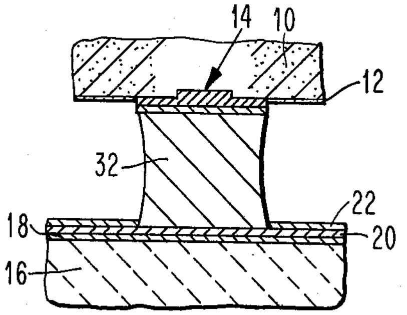
FIG. 2 shows a greatly enlarged partially elongated solder joint formed by the process of the present invention.
Figure 3:
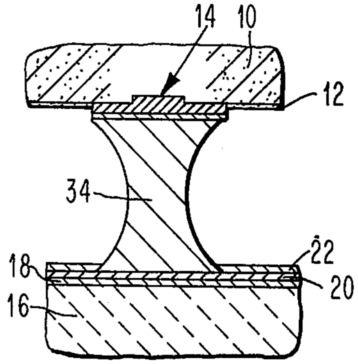
FIG. 3 shows a greatly enlarged still greater elongated solder joint formed by the process of the present invention.

The most desirable condition is where the shear stresses are distributed uniformly along the height of the solder terminal so that the probability of failure can accrue at any place between the component and the carrier. To achieve this condition the elongation of the terminals connections to the FIG. 2 or FIG. 3 structure is accomplished according to the method of the present invention. In FIGS. 2 and 3 like numbers indicate the same elements as FIG. 1.

Figure 4:
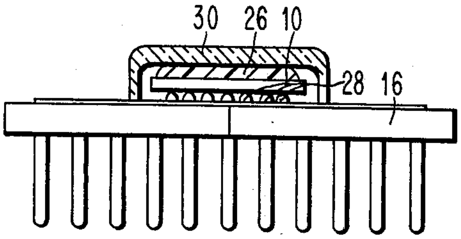
FIGS. 4 and 5 illustrate the method of the present invention.
Figure 5:
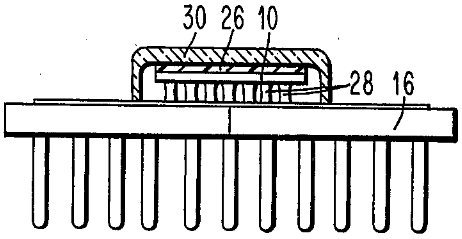

The first embodiment method of the present invention can be understood with reference to FIGS. 4 and 5. In this embodiment, the substrate 16 has already been joined to the semiconductor chip 10 by the method described above to produce a FIG. 1 type of joint 8. An amount of vaporizable material 26 is placed on the surface opposite to the surface having the soldered terminals 28. A bridge 30 is placed over the component 10 so that there is a cavity between the surface of the component 10 having the vaporizable material 26 thereon and the bottom of the bridge 30. The height of the bridge determines the ultimate height of the joint. The bridge may be made of any suitable material such as plastic or glass which can maintain its integrity during the subsequent heating step. The composite is then put into a furnace which is maintained at a temperature which will cause the solder terminals 28 to remelt. The vaporizable liquid material is made fluid at least during the heating of the material in the furnace so that it wets the upper surface of the component 10 and the bottom surface of the bridge 30. During the time in the furnace the vaporizable material 26 is vaporized to the extent desired. The reduction of the amount of vaporizable material causes surface tension to lift the component 14 which in turn elongates the solder terminals or connections 28. FIG. 5 shows the result of the reduction of the vaporizable material 26 and the elongation of the solder terminals 28. The heating process is continued until the desired amount of lift and elongation of the solder terminals has taken place. At that point the temperature of the composite or module is reduced such as by removal from the furnace and the solder is brought to room temperature which thereby fixes the shape of the connection to that of 32 of FIG. 2 or the hourglass shape of 34 as shown in FIG. 3.

For comparison, FIG. 1 solder joint is about 3.6 mils in height, FIG. 2 about 5 mils and FIG. 3 about 5 to 10 mils. It is preferred to lift the height at least 50% to obtain increased lifetime.

A second method for positioning microminiature components on a carrying structure while adjusting the height of the electrical connecting structure can also be understood with reference to FIGS. 4 and 5. In this case the bridge 30 and the vaporizable material 26 is placed over the semiconductor chip 10 in a similar manner as described in the first embodiment. However, in this embodiment the solder terminals 28 have not been physically and electrically joined to the carrying substrate 16. They are only held typically by a solder flux material. The composite is then placed in the furnace and the solder reflow joining together with the elongation of the solder connections is done in one step rather than the two steps in the first embodiment described above. As the vaporizable material is evaporated or vaporized the component 10 is lifted by means of surface tension and in turn the solder terminals 28 are lifted to elongate them into the shapes 32 or 34 as illustrated in FIGS. 2 and 3.

The following examples are included merely to aid in the understanding of the invention and variations may be made by one skilled in the art without departing from the spirit and scope of the invention.

Examples 1 and 2

Silicon semiconductor chips with chrome-copper-gold terminals having a diameter of approximately 5 mils and 48 terminals were obtained. Solder was evaporated onto the surface of the chip at the gold metallurgical areas. The solder was then heated to cause it to ball due to surface tension on each of the terminal sites. An alumina substrate was provided having chrome-copper-chrome merallurgical lines thereon with the sites for chip joining formed thereon by photoresist etching techniques wherein the portions of the upper chromium layer were removed to expose a joining site areas of copper of 6 mils in diameter. This substrate was then dipped into a solder bath. The solder adhered only to the copper areas. The solder utilized in the first example was 5% tin and 95% lead. The solder used in the second example 45% lead and 55% indium. The chip joining was accomplished by the normal solder reflow technique of placing the semiconductor chip with its balled solder contacts onto the substrate sites containing solder and then the composite was moved through a furnace on a conveyer at a speed of 0.5 inches/minute wherein the joining of the chip to the ceramic substrate carrier was accomplished. Then the composite proceeded through the furnace to its exit at the cooling of 44°C./minute. The peak temperature reached for the tin-lead Example was 355°C. in the center of the furnace. The peak temperature for the lead-indium Example was 250°C. and the cooling rate was also 44°C./minute. The composite module was then removed from the furnace and brought to room temperature. A drop of liquid flux was placed upon the top of the silicon chip. Kester 1544 is used for the 95% lead and 5% tin solder. Alpha 102-1500 is diluted 3-1 with benzyl-alcohol for the 55% indium-45% lead solder. A glass bridge structure was put over the chip as illustrated in FIG. 4 so that there is a cavity between the top of the chip and the bottom of the glass bridge. The liquid flux made contact with the glass bridge and the semiconductor chip. The cavity height was determined by the length of the bridge legs that is desired to lift the semiconductor chip. The module was then moved into the furnace for the elongation solder reflow. In the furnace, the solder became liquid and the flux began to evaporate. The semiconductor chip was pulled upward away from the substrate due to the greater surface tension of the flux at the top of the chip than below the chip where only the solder was acting upon the chip. The area of contact of the flux between the semiconductor chip and the glass bridge is much larger than the area of the contact of the solder to the semiconductor chip. After the module is brought out of the furnace the bridge was washed off together with the remaining rosin residue of the flux. It was the flux vehicle which was fully evaporated. The bridge used had legs of slightly different heights so that each of the 48 solder terminals in each Example were lifted at a slightly different height.

The lead-tin solder terminal module and the lead-indium solder terminal module, together with similar modules which had gone through only a single solder reflow cycle, were then subjected to temperature changes which causes thermal stresses of the semiconductor chip. The stress axis passes through the neutral point within the chip, according to the method described in an article by L. Goldmann entitled "Geometric Optimization of Controlled Collapse Interconnections", IBM Journal of Research and Development, Vol. 13, No. 3, May 1969, pp. 251–265, particularly at page 255, and an article by K. C. Norris et al entitled "Reliability of Controlled Collapse Interconnections" in the same IBM Journal issue, pp. 266–271, particularly at pages 266 and 267.

Figure 6:
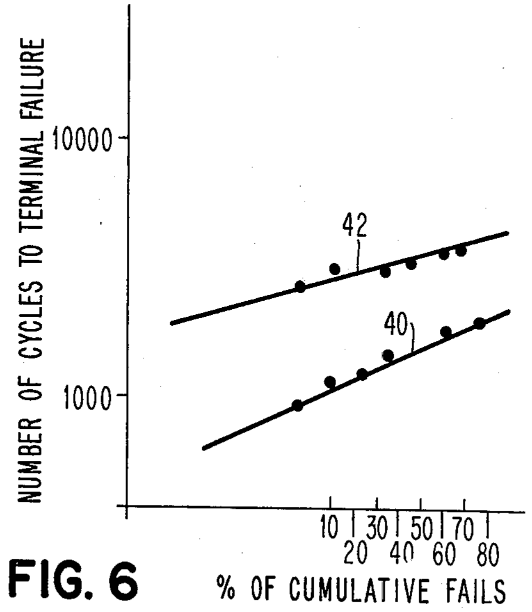
FIGS. 6 and 7 show the comparative failure results of thermal-cycling elongated or non-elongated solder joints of two different types of solder.

The FIG. 6 shows the results for the tin-lead solder module wherein there were three thermal cycles per hour and a temperature variation of 0° to 100° C. The FIG. 6 shows the individual points for the lifted (two solder reflows) 42 and unlifted (one solder reflow) 40 for the tin-lead solder terminals. The points are plotted as percent of cumulative failures versus number of cycles on logarithmic scale.

Figure 7:
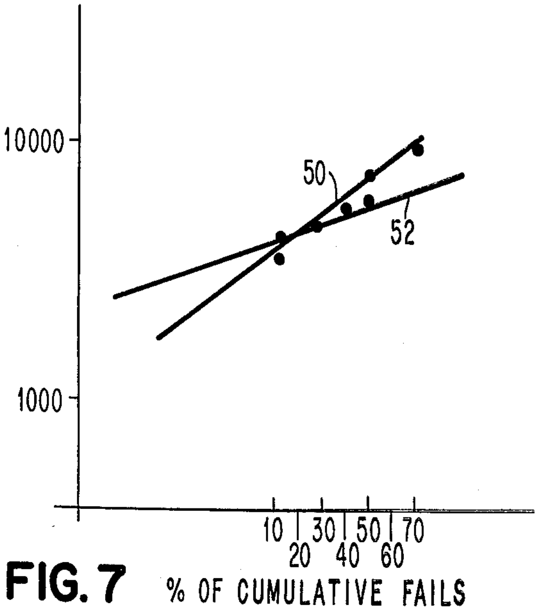

FIG. 7 shows the thermal cycle results of lifted (2 solder reflows) 50 and unlifted (one solder reflow) 52 terminals wherein the conditions are three cycles per hour and 0°–100° C. temperature variations. The Example 2 lead-indium of FIG. 7 is still on test with only 68% completed. However, FIG. 7 shows the improvement of the lifted terminals over the unlifted terminals in lifetime.

Various types of soldering materials can be used in solder reflow processes. However, the alloys of lead and tin, lead and indium, together with other alloys of silver and gallium can be the usual low temperature solders which are most useful. If compatibility with high temperature processes such as hermetic sealing is required, such low melting solders could be replaced with higher melting ones. The temperature of module fabrication is extremely important and is generally limited to temperatures of less than 450°C. The lower limit is defined by tests and usage conditions and the maximum temperature by the condition of what is being joined. Where a silicon semiconductor chip is being joined, for example, to a substrate the temperature should not be such so as to adversely effect the junctions in the silicon semiconductor chip.

The vaporizable material also can be of widely different types. The requirements being that it would wet the surface of the component and the bridge, that the surface tension is sufficient to lift the component when the solder is liquid and that it evaporates at the appropriate temperature when the solder is in liquid form. Examples of this type of material are Kester 1544 material which is a diethylamine type rosin having the approximate formula $(C_2H_5)_2$ NH.HCl and Alpha 102-1500 is composed of A. 34% abietic acid ($C_{20}$ $H_{30}O_2$)

B. 66% benzyl alcohol ($C_6H_5.CH_2OH$)

Structure of molecule A.

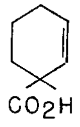

Structure of molecule B.

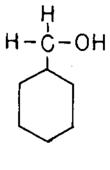

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for elongating the solder terminals physically and electrically connecting a component to a carrying structure comprising:

positioning a component onto a carrying structure spaced therefrom by solder terminals;

placing an amount of vaporizable material upon the surface of said component opposite to the surface having said solder terminals;

placing a bridge over the components so that there is a cavity between the surface of said component having said material thereon and the bottom of the bridge;

said material becomes liquid with temperature rise at least before the said solder melts at which time it wets the said bridge and said surface;

heating the structure until said solder terminals are softened and until a desired portion of said material is evaporated which pulls by surface tension the said component closer to said bridge and which in turn elongates the said solder terminals; and cooling the structure to room temperature.

2. The method of claim 1 wherein the said component is physically and electrically connected to said carrying structure at the beginning of the method for elongating the said solder terminals.

3. The method of claim 1 wherein the said component is physically and electrically connected to said carrying structure while simultaneously forming the desired elongated said solder terminals.

4. The method of claim 1 wherein the said solder terminals are composed of a lead-indium solder.

5. The method of claim 1 wherein the said solder terminals are composed of a tin-lead solder.

6. The method of claim 1 wherein the vaporizable material is a liquid at room temperature.

7. The method of claim 1 wherein the solder terminals are elongated at least 50%.

8. The method of claim 1 wherein the component is a silicon semiconductor chip and the carrying structure a ceramic substrate.

9. The method of claim 8 wherein the substrate is composed of alumina with metallic conductors thereon.

10. The method of claim 9 wherein the metallic conductors are composed of chromium and copper.

11. The method of claim 9 wherein the metallic conductors are composed of a noble metal containing coalesced glass frit.

12. A method for positioning microminiature components in electrical contact with and otherwise spaced from a carrying structure while adjusting the height of the electrical connecting structures comprising:

providing an electrically conductive pattern on said carrying structure having a plurality of connecting areas;

said connecting areas being wettable with solder;

the areas immediately surrounding the said connecting areas being not wettable by solder;

applying a coating of solder to the said connecting areas;

positioning a microminiature component having solder contacts extending therefrom onto preselected connecting areas of said conductive pattern;

placing an amount of vaporizable material upon the surface of the said component opposite to the surface having the solder contacts;

placing a bridge over the component so that there is a cavity between the surface of said component having said material thereon and the bottom of the bridge;

heating the said solder contacts and said preselected connecting areas to a temperature and for time sufficient to soften the respective solder areas and to fuse the said component to the said substrate in spaced relation to said substrate, the surface tension of said solder during heating being sufficient to support said microminiature component from the surface of said substrate until said contacts are fused to said connecting areas and the said material which becomes liquid at least before the said solder melts wets both the surface and the bridge, the said material evaporating which pull by surface tension the said component closer to said bridge and which in turn elongates the said electrical conducting structures.

13. The method of claim 12 wherein said solder terminals are composed of a lead-indium solder.

14. The method of claim 12 wherein said solder terminals are composed of a tin-lead solder.

15. The method of claim 12 wherein said component is a silicon semiconductor chip and said carrying structure is an alumina substrate with metallic conductors thereon.

* * * * *